May 14, 1935.  R. A. SHIPLEY  2,001,316
CONDUIT AND METHOD OF MAKING THE SAME
Filed June 20, 1931   2 Sheets-Sheet 1

INVENTOR
Roy A. Shipley
by Byrnes, Stebbins, Parmelee & Glenn
his attorneys

May 14, 1935. R. A. SHIPLEY 2,001,316
CONDUIT AND METHOD OF MAKING THE SAME
Filed June 20, 1931 2 Sheets-Sheet 2
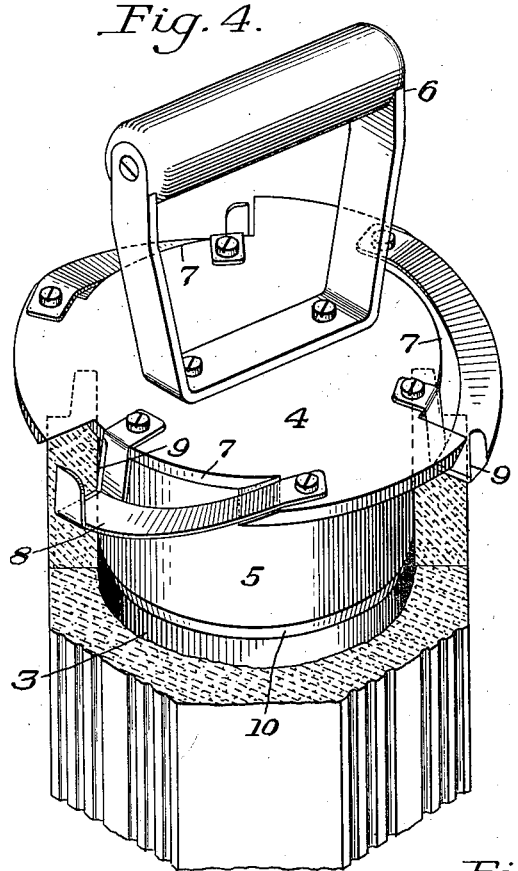
Fig. 4.
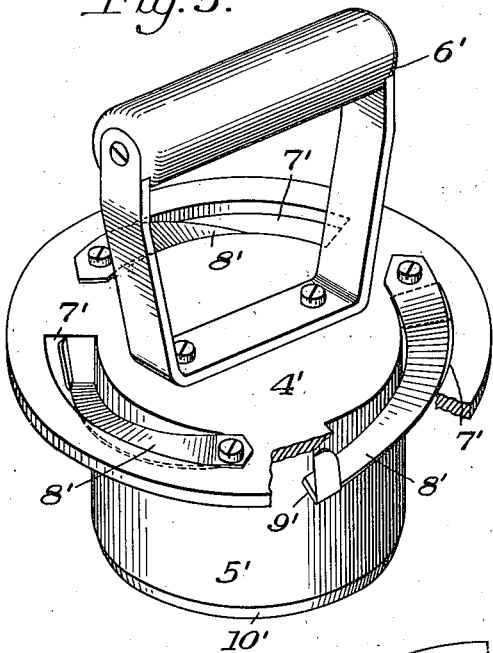
Fig. 5.
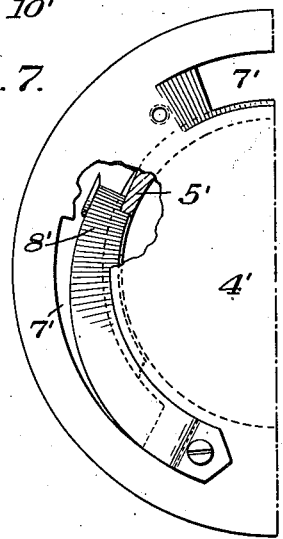
Fig. 7.
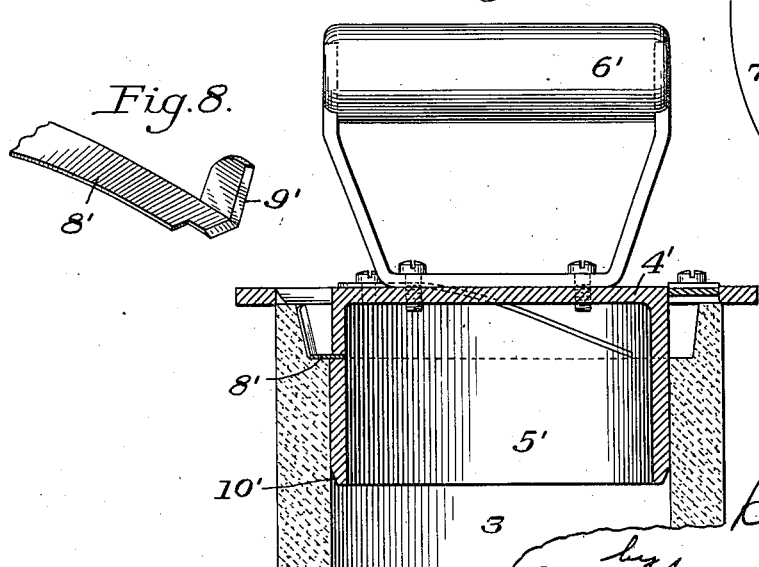
Fig. 8.
Fig. 6.
INVENTOR
Roy A. Shipley
by
Byrnes, Stebbins, Parmelee & Blenko
his attorneys Patented May 14, 1935

2,001,316

UNITED STATES PATENT OFFICE 2,001,316

CONDUIT AND METHOD OF MAKING THE SAME

Roy A. Shipley, Pittsburgh, Pa., assignor to National Fireproofing Corporation, Pittsburgh, Pa., a corporation of Pennsylvania Application June 20, 1931, Serial No. 545,779

4 Claims. (Cl. 25—156)

This invention relates broadly to conduit and to methods of making the same, and more particularly to conduit made up of sections having interfitting portions to assist in maintaining the integrity and alignment of the conduit. It relates still more particularly to the art of making conduit of material susceptible of ready working or shaping, such, for example, as ceramic material which in the "green" state may be cut, worked and shaped with little difficulty.

The invention further relates to conduit made up of sections having one or more ducts adapted to be aligned upon disposal of the sections in cooperative relationship end to end and provided with generally longitudinally directed complementary projections and recesses extending generally peripherally of the ducts and adapted to interfit to assist in strengthening and maintaining the integrity and alignment of the conduit; and to a method of making such conduit sections.

I provide a conduit made up of sections composed entirely of ceramic material, said conduit being of constant external and internal cross-section, said sections having tapered interfitting peripheral projections and recesses at their extremities.

I further provide a method of making conduit sections, comprising providing appropriate lengths of material having ducts therethrough, and altering the shape of the ends of such lengths to provide generally longitudinally extending projections and recesses adapted to interfit upon alignment of such lengths to provide a conduit. I also provide a method of making conduit sections, comprising providing appropriate lengths of material having ducts therethrough adapted to be aligned, and removing portions of the material at the extremities of the ducts to provide projections and recesses adapted to interfit upon alignment of such lengths.

Other objects and advantages of the invention will become apparent as the following description of a present preferred embodiment thereof proceeds.

In the accompanying drawings I have shown a present preferred embodiment of the invention, wherein Figure 1 is a longitudinal central cross-sectional view through a portion of a length of extruded ceramic material provided with a central duct;

Figure 4 is a perspective view of a forming tool, such as that of Figure 3, shown in cooperative relationship with an extremity of a conduit length for shaping such extremity, a portion of the conduit length being cut away;

Figure 5 is a perspective view of a forming tool similar to that shown in Figure 4 but adapted for a somewhat different operation, a portion of the head of the tool being cut away for the sake of clearness;

Figure 6 is a view similar to Figure 3 showing a forming tool, such as that of Figure 5, in cooperative relationship with a conduit length;

Figure 7 is a fragmentary top plan view, with a portion cut away, of the forming tool shown in Figure 5; and Figure 8 is a fragmentary perspective view of one of the shaping devices.

Figure 1:
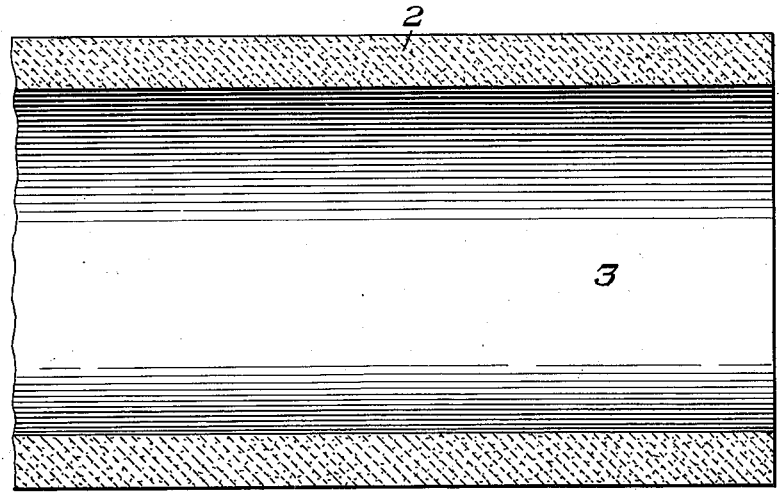

Referring now more particularly to the drawings, Figure 1 shows in central longitudinal cross-section a portion of a length 2 of extruded ceramic material just as it comes from the extrusion die and in the green or generally plastic state. The length is of generally octagonal external cross-section, as indicated in Figure 4, and is provided centrally thereof with a longitudinally extending duct 3.

In the extrusion process the green ceramic material is forced through a die and emerges in a straight continuous length of substantially uniform cross-section, such as the length shown in Figure 1.

The first step in the formation of conduit sections out of the extruded length comprises severing the length substantially perpendicularly to its axis to provide pieces of desired lengths the end faces of which are substantially plane and parallel. Such pieces at the time they are severed from the extruded length are of such consistency that they may be handled without substantial damage thereto, but the green ceramic material is readily workable and can be easily cut and shaped. After cutting the extruded length into the pieces mentioned, I preferably shape the ends of the pieces by means of suitable forming apparatus so as to produce generally similar conduit sections the respective ends of which interfit on being placed together, whereby to strengthen and assist in maintaining the integrity of the conduit thus formed.

Figure 2:
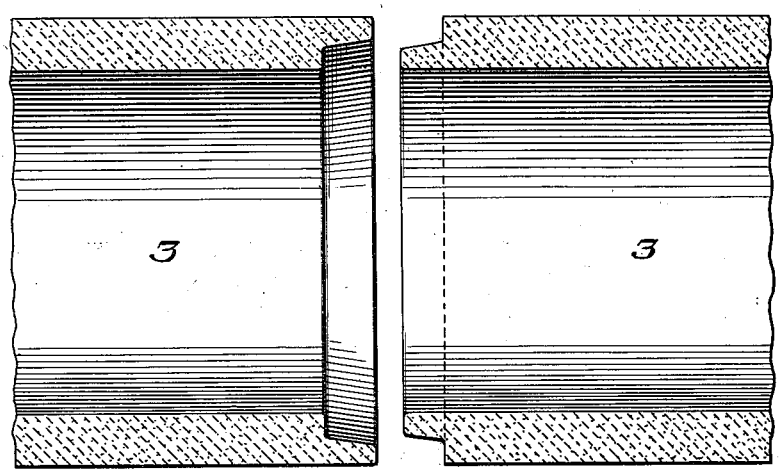
Figure 2 is a longitudinal central cross-sectional view through portions of a pair of conduit sections having adjacent extremities of complementary shape, and showing such sections in position to be moved toward one another into interfitting relationship to form a conduit.

I prefer to form one extremity of each conduit section as shown at the left-hand side of Figure 2 and the opposite extremity as shown at the right-hand side of such figure, although, if desired, both ends of a section may be similarly shaped and may cooperate with an end of an adjacent section shaped complementarily. The conduit section extremity shown at the left-hand side of Figure 2 is formed at the end of a piece cut as above described from the extruded length by removing a generally ring-shaped mass of the green ceramic material from the inner portion of the end of the section. Similarly the conduit section extremity shown at the right-hand side of the same figure is formed at the end of a piece cut as above described from the extruded length by removing a generally ring-shaped mass of the green ceramic material from the outer portion of the end of the section. Each of the generally ring-shaped masses of ceramic material which is removed is tapered, as clearly indicated in Figure 2, and the respective ends are thus formed of complementary shape and are adapted to be moved together into interfitting relationship, the taper of the respective recesses and projections enabling easy and precise centering. As the respective tapers are at the same angle and the depth of the recess in one extremity is substantially equal to the length of the projection on the other, the two extremities when pressed together form a conduit whose internal and external cross-sections are substantially constant in spite of the joint.

Not only does this provision assist in strengthening the conduit, but it renders far simpler the assembly of the sections than the prior method of utilizing dowel pins in holes provided in the extremities of the respective sections.

When the conduit is used for carrying electric conductors the amount of protection and insulation afforded at the joints is precisely the same as throughout the bodies of the sections and no enlarged radially projecting portions are necessary. The joints may, if desired, be cemented or taped.

Figure 3:
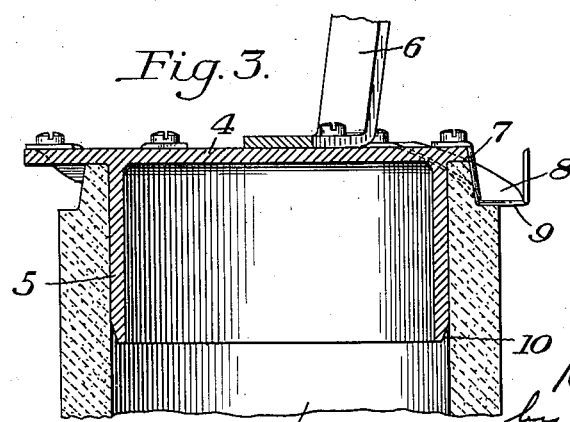
Figure 3 is a longitudinal central cross-sectional view through a portion of a conduit length showing forming apparatus in position to shape an end of such length and after the shaping operation has been completed.

The shaping of the ends of the sections may be performed either by hand or by machinery. For the sake of simplicity I have shown in the drawings a pair of hand tools, one for shaping one end of a preferred type of section and the other for shaping the other end. In Figures 3 and 4 is shown a tool for shaping a conduit section extremity as shown at the right-hand side of Figure 2, and in Figures 5, 6, 7 and 8 is shown a tool for shaping a conduit section extremity as shown at the left-hand side of Figure 2.

Referring now more particularly to Figures 3 and 4, the forming or shaping tool comprises a head 4 which is generally flat and with which is connected substantially centrally thereof and extending substantially perpendicularly therefrom a generally cylindrical guiding portion 5 having a smooth exterior adapted to snugly fit within an extremity of a conduit duct whereby to guide the tool for generally rotatable movement with respect thereto. Connected with the opposite face of the head 4 is a handle 6 suitable for manual operation for rotating the tool with respect to the duct.

The under portion of the head 4 outside the guiding portion 5 is substantially flat and smooth and the head is provided at substantially equal intervals circumferentially thereof with notches or openings 7, as shown in Figure 4. Connected with the head at each of such openings and extending generally downwardly and circumferentially therethrough is a shaping device 8. Such device is made of strip metal bent in the manner shown and having a more or less sharp forward edge 9.

The ceramic material of which the conduit section is made is, as above mentioned, plastic and easily workable in the green state although it is compressed sufficiently to offer firm guiding resistance to the forming tool. The guiding portion 5 of the tool is preferably made so as to fit snugly but not tightly within the duct in the conduit section in such manner that there is no substantial lateral play. The portion 5 is made long enough so that it engages within the duct throughout a longitudinal distance sufficient to prevent tilting of the tool. Furthermore, the guiding portion assists in supporting the green ceramic material from within and preventing the duct wall from becoming deformed during the forming operation.

The extremity of the guiding portion 5 of the tool is outwardly tapered, as shown at 10, to enable the tool to be easily inserted into the duct. One of the cut portions of the extruded length of ceramic material is placed on end and the operator grasps the tool by the handle 6 and inserts the guiding portion 5 downwardly into the duct until the lower extremities of the shaping devices 8 contact with the end wall of the extruded length. The operator then simultaneously turns the tool in the clockwise direction and gently presses it downwardly substantially axially of the extruded length. The sharp forward edges 9 of the respective shaping devices cut into the green ceramic material and sever portions of the same from the end of the extruded length until the flat bottom surface of the head 4 comes into contact with the remaining portion of the end surface whereupon further movement of the tool axially of the extruded length is prevented. Slight further rotation of the tool smooths off the cut surfaces and the end of the extruded length assumes the form shown at the right-hand side of Figure 2 and in Figures 3 and 4. The tool is then withdrawn from the duct, the partially formed conduit section inverted and the opposite end operated upon by the same or a similar tool, preferably by a tool such as that shown in Figures 5, 6, 7 and 8, the operation being substantially the same as that above described except that an interior rather than an exterior portion of the ceramic material at the end of the extruded length is removed so that the resultant effect is as shown at the left-hand side of Figure 2 and in Figure 6. During either or both of the forming operations a core or mandrel-like supporting member may be inserted into the opposite end of the extruded length to assist in maintaining and supporting it in proper position and preventing undesirable deformation thereof.

The tool shown in Figures 5, 6, 7 and 8 is similar to that shown in Figures 3 and 4 and corresponding reference numerals having primes affixed thereto denote the corresponding parts in the former figures. The openings 7' in the head 4' terminate at their inner extremities along the inner surface of the guiding portion 5' and the inner edges of the respective shaping devices 8' lie along the portion 5', and in fact are preferably inserted at least some distance into the guiding portion so as to assist in supporting them.

The effect of the tool is to remove a generally annular portion interiorly of the end of the extruded length, as above mentioned, the outwardly projecting portion of the head 4' having a flat under surface cooperating with the remaining portion of the end of the extruded length to prevent further movement of the tool longitudinally thereof.

The respective shaping devices 8 and 8' are formed to produce the tapered projections at the extremities of the conduit sections, as above described, whereby the sections will properly interfit and may be moved together into cooperative relationship without difficulty.

After the ends of the respective sections have been shaped, the sections are burned in the usual manner to produce finished conduit sections, as is usual in the art.

The former of the ends of the sections may be accomplished in various different ways, such, for example, as simply by a pressing and deforming operation which is possible on account of the plastic condition of the material, but I find it more satisfactory to use more or less pointed shaping devices which substantially cut into the material and shave off ribbon-like elongated strips as the tool is rotated and moved longitudinally of the extruded length. Although I prefer to guide the tool internally of the conduit section by means of the duct wall, the tool may be guided otherwise, such, for example, as by the outer surface of the section, particularly when round sections are being made.

The invention is equally applicable to single duct and multi-duct conduit, the end of the section at each duct being formed in the manner explained. The invention is further applicable to curved or twisted sections, and in fact the particular form of the section is immaterial, as will be appreciated. The terms "conduit section" and "conduit length" and similar expressions as used in the claims are not to be construed as being limited to conduit sections whose axes are straight lines, but also comprehend sections of other shapes.

The invention is not limited to the production of conduit sections of ceramic material, but in its broader aspects is equally adapted for use with other materials, plastic and non-plastic, in various forms.

In my copending application Serial No. 545,780, filed of even date herewith, I have described and claimed the forming apparatus which is described herein, and therefore no claim is made herein specifically to such apparatus or tools.

While I have shown and described a present preferred embodiment of the invention, it is to be distinctly understood that the same is not limited thereto, but may be otherwise variously embodied and practiced within the scope of the following claims.

I claim:

1. A method of making a ceramic conduit section, comprising providing a length of ceramic material in plastic state having a duct therethrough, and inserting partially into and bodily turning with respect to said duct a unitarily operable reaming tool having a portion for removing part of the material of said length.

2. A method of making a ceramic conduit section, comprising providing a length of ceramic material in plastic state having a duct therethrough, and simultaneously moving axially partially into said duct and bodily rotating with respect to said length a reaming tool having a portion for removing part of the material of said length.

3. A method of making a ceramic conduit section, comprising providing a length of ceramic material in plastic state having a duct therethrough, and simultaneously guiding by said duct and moving axially partially thereinto and bodily rotating with respect to said length a reaming tool having a portion for removing part of the material of said length.

4. A method of making a ceramic conduit section, comprising providing a length of ceramic material in plastic state having a duct therethrough and simultaneously guiding by said length of material, moving axially thereof and bodily rotating with respect thereto a tool having a portion for removing part of the material of said length.

ROY A. SHIPLEY.